United States Patent
Xie et al.

(10) Patent No.: US 10,377,621 B2
(45) Date of Patent: Aug. 13, 2019

(54) REFRIGERATING PLANT FOR WATER DISPENSER AND CONTROL METHOD THEREFOR, AND WATER DISPENSER

(71) Applicants: FOSHAN SHUNDE MIDEA WATER DISPENSER MFG. CO., LTD., Foshan (CN); MIDEA GROUP CO., LTD., Foshan (CN)

(72) Inventors: Jianzhou Xie, Foshan (CN); Junpeng Zhang, Foshan (CN); Xingfan Li, Foshan (CN)

(73) Assignees: FOSHAN SHUNDE MIDEA WATER DISPENSER MFG. CO., LTD., Foshan, Guangdong (CN); MIDEA GROUP CO., LTD., Foshan (CN)

( * ) Notice: Subject to any disclaimer, the term of this patent is extended or adjusted under 35 U.S.C. 154(b) by 221 days.

(21) Appl. No.: 15/649,464

(22) Filed: Jul. 13, 2017

(65) Prior Publication Data

US 2017/0307288 A1  Oct. 26, 2017

Related U.S. Application Data

(63) Continuation of application No. PCT/CN2015/070920, filed on Jan. 16, 2015.

(51) Int. Cl.
*F25D 31/00* (2006.01)
*B67D 1/08* (2006.01)
(Continued)

(52) U.S. Cl.
CPC .......... *B67D 1/0857* (2013.01); *A47J 31/00* (2013.01); *B67D 1/0884* (2013.01);
(Continued)

(58) Field of Classification Search
CPC . F25C 2700/14; B67D 1/0084; B67D 1/0857; F25B 2700/2111; G05D 23/1951; F25D 31/002
See application file for complete search history.

(56) References Cited

U.S. PATENT DOCUMENTS

2001/0050004 A1  12/2001  Ugolini

FOREIGN PATENT DOCUMENTS

| CN | 1500432 A | 6/2004 |
|---|---|---|
| CN | 2643787 Y | 9/2004 |

(Continued)

OTHER PUBLICATIONS

International Search Report and Written Opinion, PCT/CN2015/070920, dated Oct. 10, 2015, 15 pgs.

*Primary Examiner* — David J Teitelbaum
(74) *Attorney, Agent, or Firm* — Morgan, Lewis & Bockius LLP

(57) ABSTRACT

A method for controlling a refrigerating device of a water dispenser. The method includes: S1, controlling a refrigerating module to cool water in a cold water tank; S2, when the temperature of the water in the cold water tank is reduced to a first preset temperature, stopping the refrigerating module at the first preset time; S3, controlling the refrigerating module to work again to continue cooling the water in the cold water tank; S4, when the temperature of the water in the cold water tank is reduced to an $n^{th}$ preset temperature, stopping the refrigerating module at the $n^{th}$ preset time; and S5, determining whether the temperature of the water in the cold water tank reaches a target temperature, and if not, repeating steps S3 and S4 after reaching a predefined number. Through multi-stage refrigeration, an ultra-low temperature refrigeration is achieved.

15 Claims, 3 Drawing Sheets

(51) Int. Cl.
*A47J 31/00* (2006.01)
*G05D 23/19* (2006.01)
(52) U.S. Cl.
CPC .... F25D 31/002 (2013.01); *F25B 2600/0251* (2013.01); *F25B 2700/2111* (2013.01); *F25C 2700/14* (2013.01); *G05D 23/1951* (2013.01)

(56) References Cited

FOREIGN PATENT DOCUMENTS

| | | |
|---|---|---|
| CN | 103017497 A | 4/2013 |
| CN | 104697259 A | 6/2015 |
| JP | 2013193768 A | 9/2013 |

REFRIGERATING PLANT FOR WATER DISPENSER AND CONTROL METHOD THEREFOR, AND WATER DISPENSER

PRIORITY CLAIM AND RELATED APPLICATIONS

This application is a continuation application of PCT Patent Application No. PCT/CN2015/070920, entitled "REFRIGERATING PLANT FOR WATER DISPENSER AND CONTROL METHOD THEREFOR, AND WATER DISPENSER" filed on Jan. 16, 2015, which is incorporated by reference in its entirety.

TECHNICAL FIELD

The present disclosure relates to a household appliance technology field, and more particularly relates to a method for controlling a refrigerating device of a water dispenser, a refrigerating device for a water dispenser and a water dispenser.

BACKGROUND

In the water fountain industry, refrigerating capacity of related refrigerating product is typically designed to be two liters due to limitation of industry cost. The cost of the refrigerating product increases greatly when the refrigerating capacity is further improved, thereby losing competitiveness in price.

In the related art, there are some disadvantages as follows.

First, a condenser in an existing water dispenser cannot meet a performance requirement of ultra-low water temperature. Since an evaporating temperature in the refrigerating system would not change after a temperature of the condenser is increased to a certain temperature, the refrigerating system loses the adjusting ability, which leads to overloaded operations of the refrigerating system for a long time. If the condenser is designed to have advanced refrigerating capacity, the cost is increased greatly although the above mentioned situation can be improved. Moreover, since the water dispenser generally has a very small size, the size of the condenser is limited accordingly.

Second, in order to meet the performance requirement of ultra-low water temperature, the evaporating temperature in the refrigerating system should be designed as a very low temperature, thus a desired gas displacement of a compressor needs to be increased accordingly. In an existing water dispenser, when the performance requirement of ultra-low water temperature is met, the gas displacement of the compressor is relatively large, such that the cost is high.

Third, in order to match with the compressor, an evaporator should be designed with a rather large size and capillary tubes should be designed to be long enough, which may cause a problem of greatly increasing the cost.

SUMMARY

Embodiments of the present disclosure seek to solve at least one of the problems existing in the related art to at least some extent.

Accordingly, a first objective of the present disclosure is to provide a method for controlling a refrigerating device for a water dispenser. By means of multi-stage refrigeration, ultra-low temperature refrigeration of water can be realized in the case of avoiding increasing gas displacement of a compressor and sizes of a condenser and an evaporator, thus improving the refrigeration capacity.

A second objective of the present disclosure is to provide a refrigerating device for a water dispenser.

A third objective of the present disclosure is to provide a water dispenser.

In order to achieve the above objectives, embodiments of a first aspect of the present disclosure provide a method for controlling a refrigerating device for a water dispenser. The refrigerating device includes a cold water tank and a refrigerating module. The method includes: S1, controlling the refrigerating module to reduce a temperature of water in the cold water tank; S2, when the temperature of the water in the cold water tank is reduced to a first predetermined temperature, stopping the refrigerating module for a first predetermined time period; S3, controlling the refrigerating module to work again to continue to reduce the temperature of the water in the cold water tank; S4, when the temperature of the water in the cold water tank is reduced to an $n^{th}$ predetermined temperature, stopping the refrigerating module for an $n^{th}$ predetermined time period, in which the $n^{th}$ predetermined temperature is not greater than an $(n-1)^{th}$ predetermined temperature, where n is a positive integer greater than or equal to 2 and less than or equal to N; and S5, determining whether the temperature of the water in the cold water tank reaches a target temperature, if no, repeating steps S3-S4 after n is stepped-up by 1, in which the target temperature is configured as an $N^{th}$ predetermined temperature.

With the method for controlling a refrigerating device for a water dispenser according to embodiments of the present disclosure, the refrigerating module is controlled to reduce the temperature of the water in the cold water tank, the refrigerating module is controlled to stop working for a first predetermined time period when the temperature of the water in the cold water tank is reduced to the first predetermined temperature, and then the refrigerating module is controlled to work again to continue to reduce the temperature of the water in the cold water tank, and the refrigerating module is controlled to stop working for an $n^{th}$ predetermined time period when the temperature of the water in the cold water tank is reduced to an $n^{th}$ predetermined temperature, it is determined whether the temperature of water in the cold water tank reaches the target temperature, and if no, the above steps are repeated after n is stepped-up by 1. Therefore, by means of multi-stage refrigeration, ultra-low temperature refrigeration of water can be realized in the case of avoiding increasing gas displacement of a compressor and sizes of a condenser and an evaporator, thus improving the refrigeration capacity. Furthermore, work performances of the compressor, the condenser and the evaporator are improved, and the stability of the compressor is ensured.

Further, when the water dispenser is in a temperature maintaining stage, the method further includes: controlling the refrigerating module to work again when the temperature of the water in the cold water tank is greater than or equal to an $(N-1)^{th}$ predetermined temperature, and stopping the refrigerating module when the temperature of the water in the cold water tank is reduced to the target temperature. In this way, the temperature of the water in the cold water tank is controlled to maintain at the target temperature, and plenty of water with ultra-low temperature may be stored for use by a user at any time.

Preferably, N is equal to 3. The refrigerating device performs a three-stage refrigeration, steps S1-S2 constitute a first stage of refrigeration, steps S3-S4 constitute a second stage of refrigeration, and step S5 constitutes a third stage of refrigeration.

Further, the method further includes: after water is consumed by a user, acquiring the temperature of the water in the cold water tank; when the temperature of the water in the cold water tank is less than a second predetermined temperature, controlling the refrigerating device to enter the temperature maintaining stage; when the temperature of the water in the cold water tank is greater than or equal to the second predetermined temperature and less than the first predetermined temperature, only performing the third stage of refrigeration; when the temperature of the water in the cold water tank is greater than or equal to the first predetermined temperature and less than a predetermined temperature threshold, performing the second stage of refrigeration and the third stage of refrigeration in sequence; and when the temperature of the water in the cold water tank is greater than or equal to the predetermined temperature threshold, performing the first stage of refrigeration, the second stage of refrigeration and the third stage of refrigeration in sequence.

In detail, each of the N predetermined time periods is determined according to a time period during which the refrigerating module recovers from a working state to an initial state.

In order to achieve the above objectives, embodiments of a second aspect of the present disclosure provide a refrigerating device for a water dispenser. The refrigerating device includes a cold water tank; a refrigerating module, configured to reduce a temperature of water in the cold water tank; a control module, configured to control the refrigerating module to reduce the temperature of the water in the cold water tank by performing following steps in sequence: S1, controlling by the control module the refrigerating module to reduce the temperature of the water in the cold water tank; S2, when the temperature of the water in the cold water tank is reduced to a first predetermined temperature, stopping the refrigerating module by the control module for a first predetermined time period; S3, controlling by the control module the refrigerating module to work again to continue to reduce the temperature of the water in the cold water tank; S4, when the temperature of the water in the cold water tank is reduced to an $n^{th}$ predetermined temperature, stopping the refrigerating module by the control module for an $n^{th}$ predetermined time period, in which the $n^{th}$ predetermined temperature is not greater than an $(n-1)^{th}$ predetermined temperature, where n is a positive integer greater than or equal to 2 and less than or equal to N; and S5, determining by the control module whether the temperature of the water in the cold water tank reaches a target temperature, if no, repeating steps S3-S4 after n is stepped-up by 1, in which the target temperature is configured as an $N^{th}$ predetermined temperature.

With the refrigerating device for a water dispenser according to embodiments of the present disclosure, the refrigerating module is controlled by the control module to reduce the temperature of the water in the cold water tank, the refrigerating module is controlled by the control module to stop working for a first predetermined time period when the temperature of the water in the cold water tank is reduced to the first predetermined temperature, and then the refrigerating module is controlled by the control module to work again to continue to reduce the temperature of the water in the cold water tank, and the refrigerating module is controlled by the control module to stop working for an $n^{th}$ predetermined time period when the temperature of the water in the cold water tank is reduced to an $n^{th}$ predetermined temperature, further the control module determines whether the temperature of water in the cold water tank reaches the target temperature, and if no, the above steps are repeated after n is stepped-up by 1. Therefore, by means of multi-stage refrigeration, ultra-low temperature refrigeration can be realized in the case of avoiding increasing gas displacement of a compressor and sizes of a condenser and an evaporator, thus improving the refrigeration capacity. Furthermore, work performances of the compressor, the condenser and the evaporator are improved, and the stability of the compressor is ensured.

Further, the control muddle is further configured to control the refrigerating module to work again when the temperature of the water in the cold water tank is greater than or equal to an $(N-1)^{th}$ predetermined temperature, and to control the refrigerating module to stop working when the temperature of the water in the cold water tank is reduced to the target temperature. In this way, the temperature of the water in the cold water tank is controlled to maintain at the target temperature, and plenty of water with ultra-low temperature may be stored for use by a user at any time.

Preferably, N is equal to 3. The refrigerating device performs a three-stage refrigeration, steps S1-S2 constitute a first stage of refrigeration, steps S3-S4 constitute a second stage of refrigeration, and step S5 constitutes a third stage of refrigeration.

Further, the control module is further configured to: acquire the temperature of the water in the cold water tank; when the temperature of the water in the cold water tank is less than a second predetermined temperature, control the refrigerating device to enter the temperature maintaining stage; when the temperature of the water in the cold water tank is greater than or equal to the second predetermined temperature and less than the first predetermined temperature, perform the third stage of refrigeration; when the temperature of the water in the cold water tank is greater than or equal to the first predetermined temperature and less than a predetermined temperature threshold, perform the second stage of refrigeration and the third stage of refrigeration; and when the temperature of the water in the cold water tank is greater than or equal to the predetermined temperature threshold, perform the first stage of refrigeration, the second stage of refrigeration and the third stage of refrigeration.

In detail, each of the N predetermined time periods is determined according to a time period during which the refrigerating module recovers from a working state to an initial state.

In order to achieve the above objectives, embodiments of a third aspect of the present disclosure provide a water dispenser. The water dispenser includes the refrigerating device for a water dispenser describe above.

With the water dispenser according to embodiments of the present disclosure, by means of multi-stage refrigeration, ultra-low temperature refrigeration can be realized in the case of avoiding increasing gas displacement of a compressor and sizes of a condenser and an evaporator, thus improving the refrigeration capacity. Furthermore, work performances of the compressor, the condenser and the evaporator are improved, and the stability of the compressor is ensured.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
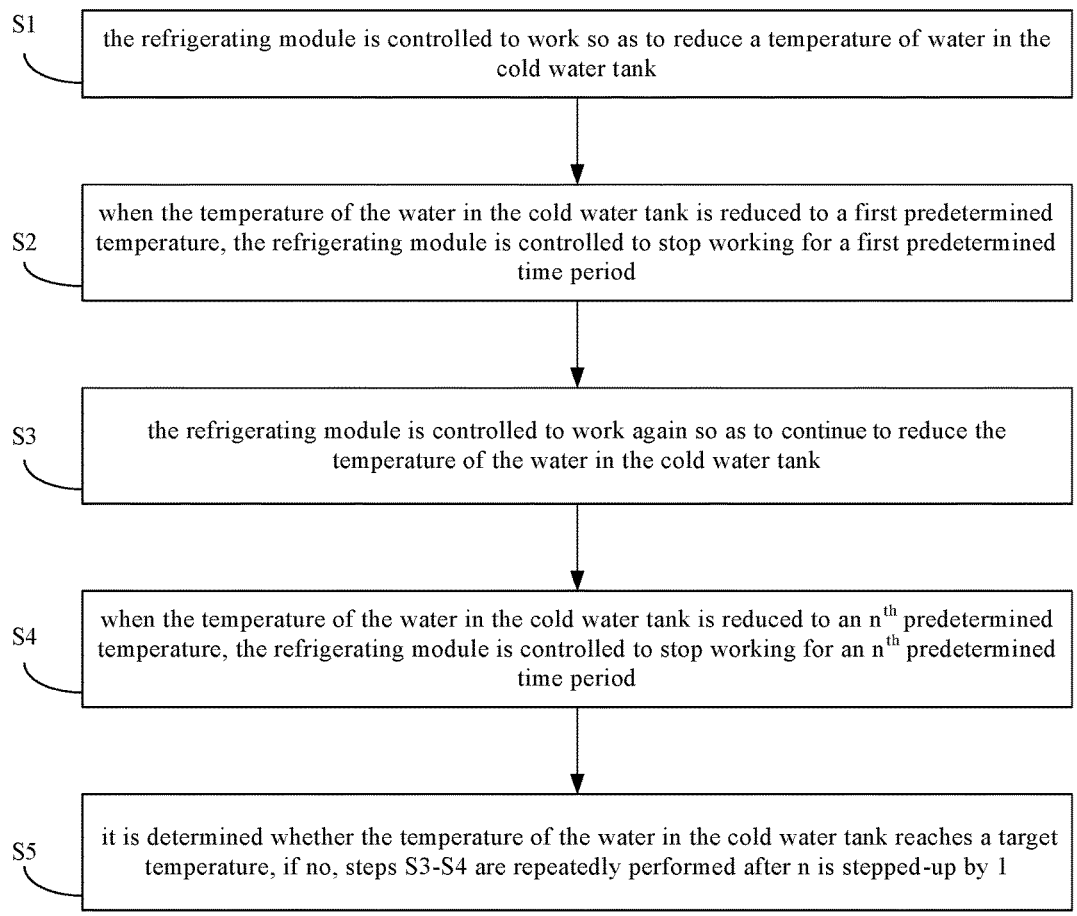
FIG. 1 is a flow chart of a method for controlling a refrigerating device for a water dispenser according to embodiments of the present disclosure.

1 cold water tank;
2 refrigerating module;
3 control module;
401 water dispenser; and
402 refrigerating device for water dispenser.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The following disclosure provides many different embodiments or examples for realizing different variations of the present invention. To simplify the disclosure of the invention, the components and configuration of specific examples are described in the following. Of course, they are merely examples and do not intend to limit the present invention. In addition, reference numbers and/or letters can be repeated in different examples in the present invention. Such repetition is for the purpose of simplification and clarity, which, in itself, does not indicate the relationship between the various embodiments and/or configurations that are discussed. Furthermore, the present invention provides examples of various specific process and materials, but those skilled in the art will be aware of the applicability of other process and/or the employment of other materials. Moreover, the structure in which the first feature being "on" the second feature as described below may include both the embodiment where the first feature is in direct contact with the second feature, and the embodiment where an additional feature is formed between the first and second features. In the latter case, the first and second features may not be in direct contact.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

In the following, the method for controlling a refrigerating device for a water dispenser, a refrigerating device for a water dispenser and the water dispenser provided according to embodiments of the present disclosure will be described with reference to accompany drawings.

FIG. 1 is a flow chart of a method for controlling a refrigerating device for a water dispenser according to embodiments of the present disclosure. The refrigerating device comprises a cold water tank and a refrigerating module. As illustrated in FIG. 1, the method includes the followings.

At block S1, the refrigerating module is controlled to reduce a temperature of water in the cold water tank.

At block S2, when the temperature of the water in the cold water tank is reduced to a first predetermined temperature, the refrigerating module is controlled to stop working for a first predetermined time period.

In other words, firstly the refrigerating module is controlled to work. When the temperature of normal temperature water in the cold water tank is reduced to the first predetermined temperature, the refrigerating device is controlled to be shut down for a certain time period, such as the first predetermined time period.

At block S3, the refrigerating module is controlled to work again to continue to reduce the temperature of the water in the cold water tank.

At block S4, when the temperature of the water in the cold water tank is reduced to an $n^{th}$ predetermined temperature, the refrigerating module is controlled to stop working for an $n^{th}$ predetermined time period.

The $n^{th}$ predetermined temperature is not greater than an $(n-1)^{th}$ predetermined temperature, where n is a positive integer greater than or equal to 2 and less than or equal to N.

At block S5, it is determined whether the temperature of the water in the cold water tank reaches a target temperature, if no, steps S3-S4 are repeatedly performed after n is stepped-up by 1. The target temperature is configured as an $N^{th}$ predetermined temperature.

In detail, after the refrigerating device is shut down for the first predetermined time period, the refrigerating device is restarted to continue to control the refrigerating module to cool the water in the cold water tank. When the temperature of the water in the cold water tank reaches the second predetermined temperature, the refrigerating device is shut down for a second predetermined time period. If the second predetermined temperature reaches the target temperature, it is unnecessary to perform steps S3-S4 repeatedly and the refrigeration process is finished, which means that N=2, and the refrigeration process can be called as a two-stage refrigeration.

If the second predetermined temperature does not reach the target temperature, steps S3-S4 are repeatedly performed after n is stepped-up by 1. In other words, the refrigerating module is controlled to work again to continue to cool the water in the cold water tank, and the refrigerating module is controlled to stop working for a third predetermined time period when the temperature of the water in the cold water tank is reduced to a third predetermined temperature. If the third predetermined temperature reaches the target temperature, the refrigeration process is finished, which means that N=3 and the refrigeration process can be called as a third-stage refrigeration.

In this way, steps S3-S4 are performed repeatedly. If a fourth predetermined temperature reaches the target temperature, it indicates that N=4 and the refrigeration process can be called as a fourth-stage refrigeration. By that analogy, steps S3-S4 are performed repeatedly until the temperature of the water in the cold water tank reaches the target temperature, i.e., $N^{th}$ predetermined temperature.

Further, when the water dispenser is in a temperature maintaining stage, after the temperature maintaining stage, i.e., step S5, the method further includes: controlling the refrigerating module to work again when the temperature of the water in the cold water tank is greater than or equal to an $(N-1)^{th}$ predetermined temperature, and stopping the refrigerating module when the temperature of the water in the cold water tank is reduced to the target temperature. In other words, during the storage of the water in the cold water tank, the temperature may increase gradually. When the temperature of the water increases to the $(N-1)^{th}$ predetermined temperature, the refrigerating module is controlled to work again. And when the temperature of the water in the cold water tank is reduced to the target temperature, the refrigerating module is controlled to stop working. In this way, the temperature of the water in the cold water tank may maintain at the target temperature, such that plenty of water with ultra-low temperature is stored for use by the user at any time.

In an embodiment of the present disclosure, when N=3, the refrigerating device performs a three-stage refrigeration, steps S1-S2 constitute a first stage of refrigeration, steps S3-S4 constitute a second stage of refrigeration, and step S5 constitutes a third stage of refrigeration.

Further, the method further includes: after water is consumed by a user, acquiring the temperature of the water in the cold water tank; when the temperature of the water in the cold water tank is less than a second predetermined temperature, controlling the refrigerating device to enter the temperature maintaining stage; when the temperature of the water in the cold water tank is greater than or equal to the second predetermined temperature and less than the first predetermined temperature, only performing the third stage of refrigeration; when the temperature of the water in the cold water tank is greater than or equal to the first predetermined temperature and less than a predetermined temperature threshold, performing the second stage of refrigeration and the third stage of refrigeration in sequence; and when the temperature of the water in the cold water tank is greater than or equal to the predetermined temperature threshold, performing the first stage of refrigeration, the second stage of refrigeration and the third stage of refrigeration in sequence.

It can be understood that, the more the water taken by the user from the cold water tank is, the higher the temperature of the water in the cold water tank increases. In this way, after water is taken by the user, if the temperature of the water in the cold water tank is greater than the target temperature and less than the second predetermined temperature, the refrigerating device directly enters the temperature maintaining stage. In other words, when the temperature of the water in the cold water tank is greater than or equal to the second predetermined temperature, the refrigerating module is controlled to work again. When the temperature of the water in the cold water tank is reduced to the target temperature, the refrigerating module is controlled to stop working, such that the temperature of the water in the cold water tank maintains at the target temperature, and thus the user can take cold water at any time.

When the temperature of the water in the cold water tank is greater than the second predetermined temperature and less than or equal to the first predetermined temperature, the refrigerating module is controlled to work. When the temperature of the water in the cold water tank is reduced to the target temperature, the refrigerating module is controlled to stop working, such that the refrigerating device enters the temperature maintaining stage so as to control the temperature of the water in the cold water tank to maintain at the target temperature, and thus the user can take cold water at any time.

When the temperature of the water in the cold water tank is greater than the first predetermined temperature and less than or equal to a predetermined temperature threshold, the refrigerating module is controlled to work. When the temperature of the water in the cold water tank is reduced to the second predetermined temperature, the refrigerating module is controlled to stop working below the second predetermined temperature. And then the refrigerating module is controlled to work again. The refrigerating module is controlled to stop working when the temperature of the water in the cold water tank is reduced to the target temperature. The refrigerating device enters the temperature maintaining stage and the temperature of the water in the cold water tank is controlled to maintain at the target temperature, such that the user can take the cold water at any time.

When the temperature of the water in the cold water tank is greater than or equal to the predetermined temperature threshold, the refrigerating module is controlled to work. When the temperature of the water in the cold water tank is reduced to the first predetermined temperature, the refrigerating module is controlled to stop working below the first predetermined temperature. And then the refrigerating module is controlled to work again. When the temperature of the water in the cold water tank is reduced to the second predetermined temperature, the refrigerating module is controlled to stop working below the second predetermined temperature. And then the refrigerating module is controlled to work again. The refrigerating module is controlled to stop working when the temperature of the water in the cold water tank is reduced to the target temperature. The refrigerating device enters the temperature maintaining stage and the temperature of the water in the cold water tank is controlled to maintain at the target temperature, such that the user can take the cold water at any time.

In addition, it should be noted that, each of N predetermined time periods is determined according to a time period during which the refrigerating module recovers from a working state to an initial state. Preferably, the N predetermined time periods are the same, for example greater than or equal to two minutes.

Figure 2:
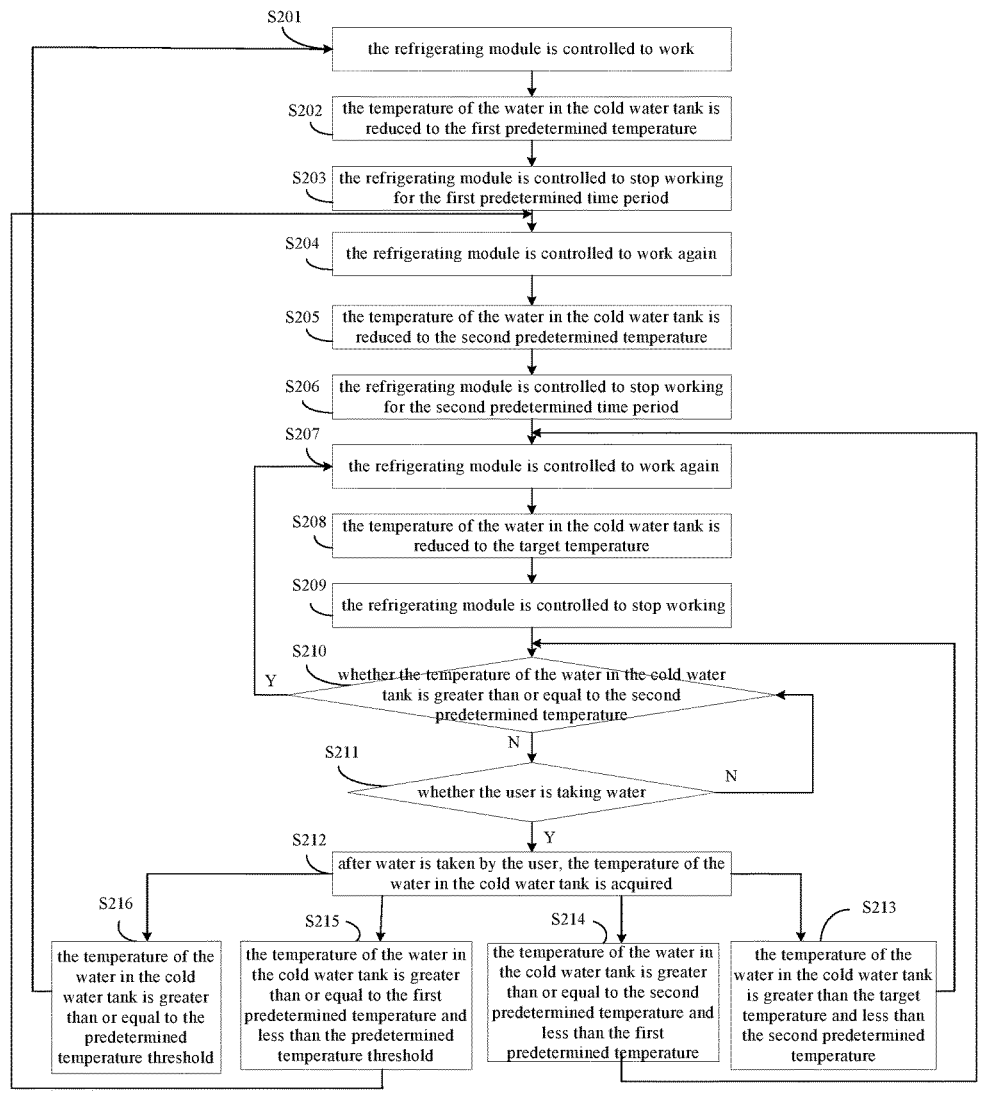
FIG. 2 is a flow chart of a method for controlling a refrigerating device for a water dispenser according to a specific embodiment of the present disclosure.

The method for controlling a refrigerating device for a water dispenser according to embodiments of the present disclosure will be described below by taking a three-stage refrigeration as an example. As illustrated in FIG. 2, the method includes the followings.

At block S201, the refrigerating module is controlled to work.

At block S202, the temperature of the water in the cold water tank is reduced to the first predetermined temperature.

The first predetermined temperature may be 6 degree centigrade. For example, the temperature of the water in the cold water tank is reduced from normal temperature to 6 degree centigrade, and this stage can be called as thin-ice phase or slight-cold word.

At block S203, the refrigerating module is controlled to stop working for the first predetermined time period.

The first predetermined time period may be five minutes. After the refrigerating module stops working for 5 minutes, the temperature of the water in the cold water tank increases slightly. For example, the temperature of the water is between 6 degree centigrade and 10 degree centigrade.

At block S204, the refrigerating module is controlled to work again.

At block S205, the temperature of the water in the cold water tank is reduced to the second predetermined temperature.

The second predetermined temperature may be 4 degree centigrade. For example, the temperature of the water in the cold water tank is reduced from 6 degree centigrade to 4 degree centigrade. The stage in which the temperature of the water in the cold water tank is reduced from the first predetermined temperature to the second predetermined temperature can be called as ice phase or Medium-cold word.

At block S206, the refrigerating module is controlled to stop working for the second predetermined time period.

The second predetermined time period may be five minutes. After the refrigerating module stops working for 5 minutes, the temperature of the water in the cold water tank increases slightly. For example, the temperature of the water is between 4 degree centigrade and 6 degree centigrade.

At block S207, the refrigerating module is controlled to work again.

At block S208, the temperature of the water in the cold water tank is reduced to the target temperature.

The target temperature may be 2 degree centigrade. The temperature of the water in the cold water tank is reduced from 4 degree centigrade to 2 degree centigrade. The stage in which the temperature of the water in the cold water tank is reduced from the second predetermined temperature to the target temperature can be called as ice-storing phase or extreme-cold word.

At block S209, the refrigerating module is controlled to stop working.

At block S210, it is determined whether the temperature of the water in the cold water tank is greater than or equal to the second predetermined temperature, if yes, an action at block S207 is executed, if no, an action at block S211 is executed.

In other words, the temperature of the water in the cold water tank is controlled to stay in the ice-storing stage or extreme-cold word. When the temperature of the water increases to 4 degree centigrade, the refrigerating module is controlled to work. When the temperature of the water reaches 2 degree centigrade, the refrigerating module is controlled to stop working, such that plenty of water with ultra-low temperature is stored for use by the user.

At block S211, it is determined whether the user is taking water, if yes, an action at block S212 is executed, if no, the action at block S210 is executed.

At block S212, after water is taken by the user, the temperature of the water in the cold water tank is acquired. When the temperature of the water in the cold water tank is greater than the target temperature and less than the second predetermined temperature, an action at block S213 is executed. When the temperature of the water in the cold water tank is greater than or equal to the second predetermined temperature and less than the first predetermined temperature, an action at block S214 is executed. When the temperature of the water in the cold water tank is greater than or equal to the first predetermined temperature and less than the predetermined temperature threshold, an action at block S215 is executed. When the temperature of the water in the cold water tank is greater than or equal to the predetermined temperature threshold, an action at block S216 is executed.

The predetermined temperature threshold may be 10 degree centigrade.

At block S213, when the temperature of the water in the cold water tank is greater than the target temperature and less than the second predetermined temperature, the action at block S210 is executed.

In the case that the user takes very little water, after water is taken, the temperature of the water in the cold water tank has not increased to 4 degree centigrade, and the refrigerating module enters the temperature maintaining stage. When the temperature of the water increases to 4 degree centigrade, the refrigerating module is controlled to work, and when the temperature of the water reaches 2 degree centigrade, the refrigerating module is controlled to stop working, such that plenty of water with ultra-low temperature can be stored at any time for use by the user.

At block S214, when the temperature of the water in the cold water tank is greater than or equal to the second predetermined temperature and less than the first predetermined temperature, the action at block S207 is executed.

In the case that the user takes a small amount of water, after water is taken, when the temperature of the water in the cold water tank is greater than 4 degree centigrade and less than or equal to 6 degree centigrade, the refrigerating module is controlled to work. When the temperature of the water in the code water tank is reduced to 2 degree centigrade, the refrigerating module is controlled to stop working, which means that only the third stage of refrigeration is performed. And then the refrigerating device is controlled to enter the temperature maintaining stage, such that plenty of water with ultra-low temperature is stored for use by the user.

At block S215, when the temperature of the water in the cold water tank is greater than or equal to the first predetermined temperature and less than the predetermined temperature threshold, the action at block S204 is executed.

In the case that the user takes a normal amount of water, after water is taken, when the temperature of the water in the cold water tank is greater than 6 degree centigrade and less than or equal to 10 degree centigrade, the refrigerating module is controlled to work. When the temperature of the water in the cold water tank is reduced to 4 degree centigrade, the refrigerating module is controlled to stop working for 5 minutes. And then the refrigerating module is controlled to work again. When the temperature of the water in the cold water tank is reduced to 2 degree centigrade, the refrigerating module is controlled to stop working. In other words, the second stage of refrigeration and the third stage of refrigeration are performed in sequence, i.e., two-stage refrigeration is performed. And then, the refrigeration device is controlled to enter the temperature maintaining stage, such that plenty of water with ultra-low temperature is stored for use by the user.

At block S216, when the temperature of the water in the cold water tank is greater than or equal to the predetermined temperature threshold, the action at block S201 is executed.

In the case that the user takes plenty of water, after water is taken, when the temperature of the water in the cold water tank is greater than or equal to 10 degree centigrade (i.e., the predetermined temperature threshold in this step), the refrigerating module is controlled to work. When the temperature of the water in the cold water tank is reduced to 6 degree centigrade, the refrigerating module is controlled to stop working for 5 minutes. And then the refrigerating module is controlled to work again. When the temperature of the water is reduced to 4 degree centigrade, the refrigerating module is controlled to stop working for 5 minutes. And then the refrigerating module is controlled to work again. When the temperature of the water is reduced to 2 degree centigrade, the refrigerating module is controlled to stop working. In other words, the first stage of refrigeration, the second stage of refrigeration and the third stage of refrigeration are performed in sequence, i.e., three-stage refrigeration is performed. And then, the refrigeration device is controlled to enter the temperature maintaining stage, such that plenty of water with ultra-low temperature is stored for use by the user. In embodiments of the present disclosure, the predetermined temperature threshold can be set according to user requirements or a type or version of the water dispenser. When the temperature of the water in the cold water tank is greater than or equal to the predetermined temperature threshold, the refrigerating device is controlled to perform refrigeration with all of the refrigeration stages (such as the three-stage refrigeration in the above embodiment).

With the method for controlling a refrigerating device for a water dispenser, the refrigerating module is controlled to reduce the temperature of the water in the cold water tank, the refrigerating module is controlled to stop working for a first predetermined time period when the temperature of the water in the cold water tank is reduced to the first predetermined temperature, and then the refrigerating module is controlled to work again to continue to cool the water in the cold water tank, and the refrigerating module is controlled to stop working for an $n^{th}$ predetermined time period when the temperature of the water in the cold water tank is reduced to an $n^{th}$ predetermined temperature, it is determined whether the temperature of water in the cold water tank reaches the target temperature, and if no, the above steps are repeated after n is stepped-up by 1. Therefore, by means of multi-stage refrigeration, ultra-low temperature refrigeration of water can be realized in the case of avoiding increasing gas displacement of a compressor and sizes of a condenser and an evaporator, thus improving the refrigeration capacity. Furthermore, work performances of the compressor, the condenser and the evaporator are improved, and the stability of the compressor is ensured. In addition, the temperature of the water in the cold water tank is controlled to maintain at the target temperature, such that plenty of water with ultra-low temperature can be stored for use by the user at any time.

Figure 3:
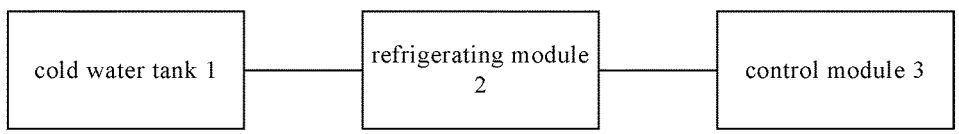
FIG. 3 is a block diagram of a refrigerating device for a water dispenser according to an embodiment of the present disclosure.

FIG. 3 is a block diagram of a refrigerating device for a water dispenser according to an embodiment of the present disclosure. As illustrated in FIG. 3, the refrigerating device includes a cold water tank 1, a refrigerating module 2 and a control module 3. The refrigerating module 2 is configured to reduce a temperature of water in the cold water tank 1.

As illustrated in FIG. 3, the control module 3 is configured to control the refrigerating module 2 to reduce the temperature of the water in the cold water tank 1 by performing the following steps.

At block S1, the refrigerating module 2 is controlled by the control module 3 to reduce the temperature of the water in the cold water tank 1.

At block S2, when the temperature of the water in the cold water tank is reduced to a first predetermined temperature, the refrigerating module 2 is controlled by the control module 3 to stop working for a first predetermined time period.

In other words, firstly the control module 3 controls the refrigerating module 2 to work. When the temperature of normal temperature water in the cold water tank 1 is reduced to the first predetermined temperature, the refrigerating device is controlled by the control module 3 to be shut down for a certain time period, such as the first predetermined time period.

At block S3, the refrigerating module 2 is controlled by the control module 3 to work again to continue to reduce the temperature of the water in the cold water tank 1.

At block S4, when the temperature of the water in the cold water tank 1 is reduced to an $n^{th}$ predetermined temperature, the refrigerating module 2 is controlled by the control module 3 to stop working for an $n^{th}$ predetermined time period. The $n^{th}$ predetermined temperature is not greater than an $(n-1)^{th}$ predetermined temperature, where n is a positive integer greater than or equal to 2 and less than or equal to N.

At block S5, the control module 3 determines whether the temperature of the water in the cold water tank 1 reaches a target temperature, if no, steps S3-S4 are repeatedly performed after n is stepped-up by 1. The target temperature is configured as an $N^{th}$ predetermined temperature.

In other words, after the refrigerating device is shut down for the first predetermined time period, the refrigerating device is restarted, and the control module 3 continues to control the refrigerating module 2 to cool the water in the cold water tank 1. When the temperature of the water in the cold water tank 1 reaches the second predetermined temperature, the refrigerating device is shut down for a second predetermined time period. If the second predetermined temperature reaches the target temperature, it is unnecessary to perform steps S3-S4 repeatedly and the refrigeration process is finished, which means that N=2, and the refrigeration process can be called as a two-stage refrigeration.

If the second predetermined temperature does not reach the target temperature, steps S3-S4 are repeatedly performed. In other words, the refrigerating module 2 is controlled by the control module 3 to work again to continue to cool the water in the cold water tank 1, and the refrigerating module 2 is controlled by the control module 3 to stop working for a third predetermined time period when the temperature of the water in the cold water tank 1 is reduced to a third predetermined temperature. If the third predetermined temperature reaches the target temperature, the refrigeration process is finished, which means that N=3 and the refrigeration process can be called as a third-stage refrigeration.

In this way, steps S3-S4 are performed repeatedly. If a fourth predetermined temperature reaches the target temperature, it indicates that N=4 and the refrigeration process can be called as a fourth-stage refrigeration. By that analogy, steps S3-S4 are performed repeatedly until the temperature of the water in the cold water tank 1 reaches the target temperature, i.e., $N^{th}$ predetermined temperature.

Further, during the temperature maintaining stage, the control muddle 3 is further configured to control the refrigerating module 2 to work again when the temperature of the water in the cold water tank is greater than or equal to an $(N-1)^{th}$ predetermined temperature, and to control the refrigerating module 2 to stop working when the temperature of the water in the cold water tank is reduced to the target temperature. In other words, during the storage of the water in the cold water tank 1, the temperature may increase gradually. When the temperature of the water increases to the $(N-1)^{th}$ predetermined temperature, the refrigerating module 2 is controlled by the control module 3 to work again. And when the temperature of the water in the cold water tank 1 is reduced to the target temperature, the refrigerating module 2 is controlled by the control module 3 to stop working. In this way, the control module 3 controls the temperature of the water in the cold water tank 1 to maintain at the target temperature, such that plenty of water with ultra-low temperature is stored for use by the user at any time.

In an embodiment of the present disclosure, when N=3, the refrigerating device performs a three-stage refrigeration, steps S1-S2 constitute a first stage of refrigeration, steps S3-S4 constitute a second stage of refrigeration, and step S5 constitutes a third stage of refrigeration.

Further, after water is consumed by a user, the control module 3 is further configured to: acquire the temperature of the water in the cold water tank 1; when the temperature of the water in the cold water tank 1 is less than a second predetermined temperature, control the refrigerating device to enter the temperature maintaining stage; when the temperature of the water in the cold water tank 1 is greater than or equal to the second predetermined temperature and less than the first predetermined temperature, control the refrigerating device to only perform the third stage of refrigeration; when the temperature of the water in the cold water tank is greater than or equal to the first predetermined temperature and less than a predetermined temperature threshold, control the refrigerating device to perform the second stage of refrigeration and the third stage of refrigeration in sequence; and when the temperature of the water in the cold water tank is greater than or equal to the predetermined temperature threshold, control the refrigerating device to perform the first stage of refrigeration, the second stage of refrigeration and the third stage of refrigeration in sequence.

It can be understood that, the more the water taken by the user from the cold water tank 1 is, the higher the temperature of the water in the cold water tank 1 increases. In this way, after water is taken by the user, if the temperature of the water in the cold water tank 1 is greater than the target temperature and less than the second predetermined temperature, the control module 3 controls the refrigerating device directly to enter the temperature maintaining stage. In other words, when the temperature of the water in the cold water tank is greater than or equal to the second predetermined temperature, the refrigerating module 2 is controlled by the control module 3 to work again. When the temperature of the water in the cold water tank 1 is reduced to the target temperature, the refrigerating module 2 is controlled by the control module 3 to stop working, such that the temperature of the water in the cold water tank 1 maintains at the target temperature, thus the user can take cold water at any time.

When the temperature of the water in the cold water tank 1 is greater than the second predetermined temperature and less than or equal to the first predetermined temperature, the refrigerating module 2 is controlled by the control module 3 to work. When the temperature of the water in the cold water tank is reduced to the target temperature, the refrigerating module 2 is controlled by the control module 3 to stop working, such that the control module 3 controls the refrigerating device to enter the temperature maintaining stage so as to control the temperature of the water in the cold water tank to maintain at the target temperature, and thus the user can take cold water at any time.

When the temperature of the water in the cold water tank 1 is greater than the first predetermined temperature and less than or equal to a predetermined temperature threshold, the refrigerating module 2 is controlled by the control module 3 to work. When the temperature of the water in the cold water tank 1 is reduced to the second predetermined temperature, the refrigerating module 2 is controlled by the control module 3 to stop working below the second predetermined temperature. And then the refrigerating module 2 is controlled by the control module 3 to work again. The refrigerating module 2 is controlled by the control module 3 to stop working when the temperature of the water in the cold water tank 1 is reduced to the target temperature. The control module 3 controls the refrigerating device to enter the temperature maintaining stage, so as to control the temperature of the water in the cold water tank 1 to maintain at the target temperature, such that the user can take the cold water at any time.

When the temperature of the water in the cold water tank 1 is greater than or equal to the predetermined temperature threshold, the refrigerating module 2 is controlled by the control module 3 to work. When the temperature of the water in the cold water tank 1 is reduced to the first predetermined temperature, the refrigerating module 2 is controlled by the control module 3 to stop working below the first predetermined temperature. And then the refrigerating module 2 is controlled by the control module 3 to work again. When the temperature of the water in the cold water tank 1 is reduced to the second predetermined temperature, the refrigerating module 2 is controlled by the control module 3 to stop working below the second predetermined temperature. And then the refrigerating module 2 is controlled by the control module 3 to work again. The refrigerating module 2 is controlled by the control module 3 to stop working when the temperature of the water in the cold water tank is reduced to the target temperature. The control module 3 controls the refrigerating device to enter the temperature maintaining stage so as to control the temperature of the water in the cold water tank 1 to maintain at the target temperature, such that the user can take the cold water at any time.

In embodiments of the present disclosure, the predetermined temperature threshold can be set according to user requirements or a type or version of the water dispenser. When the temperature of the water in the cold water tank 1 is greater than or equal to the predetermined temperature threshold, the refrigerating device 2 is controlled by the control module 3 to perform refrigeration with all of the refrigeration stages (such as the three-stage refrigeration in the above embodiment). Preferably, the predetermined temperature threshold may be 10 degree centigrade.

In addition, it should be noted that, each of N predetermined time periods is determined according to a time period during which the refrigerating module recovers from a working state to an initial state. Preferably, the N predetermined time periods are the same, for example greater than or equal to two minutes.

With the refrigerating device for a water dispenser, the refrigerating module is controlled by the control module to reduce the temperature of the water in the cold water tank, the refrigerating module is controlled by the control module to stop working for a first predetermined time period when the temperature of the water in the cold water tank is reduced to the first predetermined temperature, and then the refrigerating module is controlled by the control module to work again to continue to cool the water in the cold water tank, and the refrigerating module is controlled by the control module to stop working for an $n^{th}$ predetermined time period when the temperature of the water in the cold water tank is reduced to an $n^{th}$ predetermined temperature, further the control module determines whether the temperature of water in the cold water tank reaches the target temperature, and if no, the above steps are repeated after n is stepped-up by 1. Therefore, by means of multi-stage refrigeration, ultra-low temperature refrigeration can be realized in the case of avoiding increasing gas displacement of a compressor and sizes of a condenser and an evaporator, thus improving the refrigeration capacity. Furthermore, work performances of the compressor, the condenser and the evaporator are improved, and the stability of the compressor is ensured. In addition, the temperature of the water in the cold water tank is controlled to maintain at the target temperature, such that plenty of water with ultra-low temperature can be stored for use by the user at any time.

Figure 4:
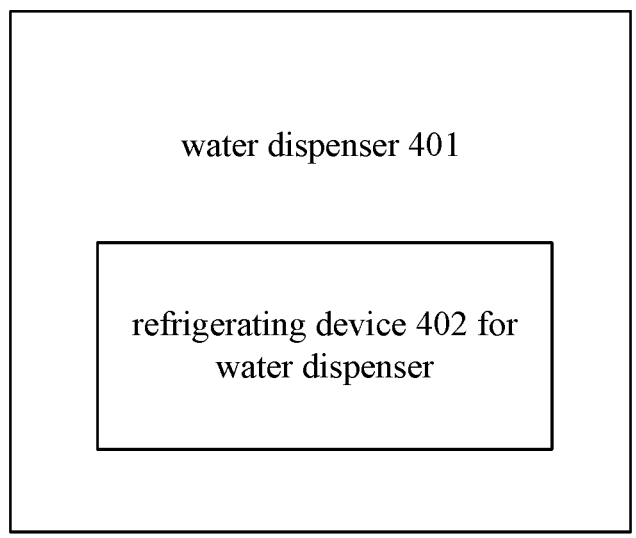
FIG. 4 is a block diagram of a water dispenser according to an embodiment of the present disclosure.

FIG. 4 is a block diagram of a water dispenser according to an embodiment of the present disclosure. As illustrated in FIG. 4, the water dispenser 401 includes a refrigerating device 402 for a water dispenser as mentioned above.

With the water dispenser according to embodiments of the present disclosure, by means of multi-stage refrigeration, ultra-low temperature refrigeration can be realized in the case of avoiding increasing gas displacement of a compressor and sizes of a condenser and an evaporator, thus improving the refrigeration capacity. Furthermore, work performances of the compressor, the condenser and the evaporator are improved, and the stability of the compressor is ensured. In addition, plenty of water with ultra-low temperature can be stored for use by the user at any time.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed:

1. A method for controlling a refrigerating device for a water dispenser, wherein the refrigerating device comprises a cold water tank and a refrigerating module, and the method comprises:

S1, controlling the refrigerating module to reduce a temperature of water in the cold water tank;

S2, when the temperature of the water in the cold water tank is reduced to a first predetermined temperature, stopping the refrigerating module for a first predetermined time period;

S3, controlling the refrigerating module to work again to continue reducing the temperature of water in the cold water tank;

S4, when the temperature of the water in the cold water tank is reduced to an nth predetermined temperature, stopping the refrigerating module for an nth predetermined time period, wherein the nth predetermined temperature is not greater than an (n−1)th predetermined temperature, where n is a positive integer greater than or equal to 2 and less than or equal to N; and S5, determining whether the temperature of the water in the cold water tank reaches a target temperature, if no, repeating steps S3-S4 after n is stepped-up by 1, wherein the target temperature is configured as an Nth predetermined temperature.

2. The method according to claim 1, wherein, when the water dispenser is in a temperature maintaining stage, the method further comprises:

controlling the refrigerating module to work again when the temperature of the water in the cold water tank is greater than or equal to an (N−1)th predetermined temperature, and when the temperature of the water in the cold water tank is reduced to the target temperature.

3. The method according to claim 2, wherein N is equal to 3, the refrigerating device performs a three-stage refrigeration, steps S1-S2 constitute a first stage of refrigeration, steps S3-S4 constitute a second stage of refrigeration, and step S5 constitutes a third stage of refrigeration.

4. The method according to claim 3, further comprising:

after water is consumed by a user, acquiring the temperature of the water in the cold water tank;

when the temperature of the water in the cold water tank is less than a second predetermined temperature, controlling the refrigerating device to enter the temperature maintaining stage;

when the temperature of the water in the cold water tank is greater than or equal to the second predetermined temperature and less than the first predetermined temperature, only performing the third stage of refrigeration;

when the temperature of the water in the cold water tank is greater than or equal to the first predetermined temperature and less than a predetermined temperature threshold, performing the second stage of refrigeration and the third stage of refrigeration in sequence; and when the temperature of the water in the cold water tank is greater than or equal to the predetermined temperature threshold, performing the first stage of refrigeration, the second stage of refrigeration and the third stage of refrigeration in sequence.

5. The method according to claim 1, wherein each of the N predetermined time periods is determined according to a time period during which the refrigerating module recovers from a working state to an initial state.

6. A refrigerating device for a water dispenser, comprising:

a cold water tank;

a refrigerating module, configured to reduce a temperature of water in the cold water tank;

a control module, configured to control the refrigerating module to reduce the temperature of the water in the cold water tank by performing following steps in sequence:

S1, controlling by the control module the refrigerating module to reduce the temperature of the water in the cold water tank;

S2, when the temperature of the water in the cold water tank is reduced to a first predetermined temperature, stopping the refrigerating module by the control module for a first predetermined time period;

S3, controlling by the control module the refrigerating module to work again to continue to reduce the temperature of the water in the cold water tank;

S4, when the temperature of the water in the cold water tank is reduced to an nth predetermined temperature, stopping the refrigerating module by the control module for an nth predetermined time period, wherein the nth predetermined temperature is not greater than an (n−1)th predetermined temperature, where n is a positive integer greater than or equal to 2 and less than or equal to N; and S5, determining by the control module whether the temperature of the water in the cold water tank reaches a target temperature, if no, repeating steps S3-S4 after n is stepped-up by 1, wherein the target temperature is configured as an Nth predetermined temperature.

7. The refrigerating device according to claim 6, wherein the control module is further configured to:

control the refrigerating module to work again when the temperature of the water in the cold water tank is greater than or equal to an (N−1)th predetermined temperature, and control the refrigerating module to stop working when the temperature of the water in the cold water tank is reduced to the target temperature.

8. The refrigerating device according to claim 7, wherein N is equal to 3, the refrigerating device performs a three-stage refrigeration, steps S1-S2 constitute a first stage of refrigeration, steps S3-S4 constitute a second stage of refrigeration, and step S5 constitutes a third stage of refrigeration.

9. The refrigerating device according to claim 8, wherein the control module is further configured to:

acquire the temperature of the water in the cold water tank;

when the temperature of the water in the cold water tank is less than a second predetermined temperature, control the refrigerating device to enter the temperature maintaining stage;

when the temperature of the water in the cold water tank is greater than or equal to the second predetermined temperature and less than the first predetermined temperature, perform the third stage of refrigeration;

when the temperature of the water in the cold water tank is greater than or equal to the first predetermined temperature and less than a predetermined temperature threshold, perform the second stage of refrigeration and the third stage of refrigeration; and when the temperature of the water in the cold water tank is greater than or equal to the predetermined temperature threshold, perform the first stage of refrigeration, the second stage of refrigeration and the third stage of refrigeration.

10. The refrigerating device according to claim 6, wherein each of the N predetermined time periods is determined according to a time period during which the refrigerating module recovers from a working state to an initial state.

11. A water dispenser, comprising a refrigerating device for a water dispenser, wherein the refrigerating device includes:

a cold water tank;

a refrigerating module, configured to reduce a temperature of water in the cold water tank;

a control module, configured to control the refrigerating module to reduce the temperature of the water in the cold water tank by performing following steps in sequence:

S1, controlling by the control module the refrigerating module to reduce the temperature of the water in the cold water tank;

S2, when the temperature of the water in the cold water tank is reduced to a first predetermined temperature, stopping the refrigerating module by the control module for a first predetermined time period;

S3, controlling by the control module the refrigerating module to work again to continue to reduce the temperature of the water in the cold water tank;

S4, when the temperature of the water in the cold water tank is reduced to an nth predetermined temperature, stopping the refrigerating module by the control module for an nth predetermined time period, wherein the nth predetermined temperature is not greater than an (n−1)th predetermined temperature, where n is a positive integer greater than or equal to 2 and less than or equal to N; and S5, determining by the control module whether the temperature of the water in the cold water tank reaches a target temperature, if no, repeating steps S3-S4 after n is stepped-up by 1, wherein the target temperature is configured as an Nth predetermined temperature.

12. The water dispenser according to claim 11, wherein the control module is further configured to:

control the refrigerating module to work again when the temperature of the water in the cold water tank is greater than or equal to an (N−1)th predetermined temperature, and control the refrigerating module to stop working when the temperature of the water in the cold water tank is reduced to the target temperature.

13. The water dispenser according to claim 12, wherein N is equal to 3, the refrigerating device performs a three-stage refrigeration, steps S1-S2 constitute a first stage of refrigeration, steps S3-S4 constitute a second stage of refrigeration, and step S5 constitutes a third stage of refrigeration.

14. The water dispenser according to claim 13, wherein the control module is further configured to:

acquire the temperature of the water in the cold water tank;

when the temperature of the water in the cold water tank is less than a second predetermined temperature, control the refrigerating device to enter the temperature maintaining stage;

when the temperature of the water in the cold water tank is greater than or equal to the second predetermined temperature and less than the first predetermined temperature, perform the third stage of refrigeration;

when the temperature of the water in the cold water tank is greater than or equal to the first predetermined temperature and less than a predetermined temperature threshold, perform the second stage of refrigeration and the third stage of refrigeration; and when the temperature of the water in the cold water tank is greater than or equal to the predetermined temperature threshold, perform the first stage of refrigeration, the second stage of refrigeration and the third stage of refrigeration.

15. The water dispenser according to claim 11, wherein each of the N predetermined time periods is determined according to a time period during which the refrigerating module recovers from a working state to an initial state.

* * * * *